United States Patent
De Young

[15] 3,691,249
[45] Sept. 12, 1972

[54] DIMERIZATION OF DIOLEFINIC COMPOUNDS

[72] Inventor: Edwin L. De Young, Chicago, Ill.

[73] Assignee: Universal Oil Products Company, Des Plaines, Ill.

[22] Filed: Oct. 7, 1970

[21] Appl. No.: 78,951

[52] U.S. Cl..............................260/677 R, 260/666 B
[51] Int. Cl...............................................C07c 11/24
[58] Field of Search.........................260/677, 666 B

[56] References Cited

UNITED STATES PATENTS

| | | |
|---|---|---|
| 3,444,258 | 5/1969 | Kohnle et al. ..............260/677 |
| 3,522,321 | 7/1970 | DeYoung ..................260/666 |
| 3,501,540 | 3/1970 | Zuech.........................260/666 |
| 2,707,196 | 4/1955 | Woods........................260/638 |

*Primary Examiner*—Delbert E. Gantz
*Assistant Examiner*—J. Nelson
*Attorney*—James R. Hoatson, Jr. and Raymond H. Nelson

[57] ABSTRACT

Conjugated diolefinic hydrocarbons are dimerized in the presence of certain organopalladium complex catalytic compositions of matter at dimerization conditions to produce a selective dimer of a starting material.

9 Claims, No Drawings

DIMERIZATION OF DIOLEFINIC COMPOUNDS

This invention relates to a process for the dimerization of unsaturated compounds and particularly, the invention is concerned with the process for dimerizing a diolefinic hydrocarbon to produce compounds which are useful as aroma chemicals.

Heretofore, many aroma compositions, such as perfumes, have depended, to a great extent, upon naturally occurring compounds which are blended or formulated to prepare final compositions of matter which have a pleasing and pleasant fragrance. For example, perfumes which comprise a mixture of organic compounds which include, for example, alcohols, aldehydes, ketones, esters, and hydrocarbons, are all combined in fixed proportion so that the odors of the fixed compounds will combine to produce a harmonious fragrance. Some of these compounds which are blended have been prepared from rose petals, geranium petals, or other flower petals which possess a distinctive fragrance; and thus, the product thereof is dependent on nature as pertains to the growing season, the harvesting of the crops, as well as climatic conditions which will insure either an abundant crop or may in some instances, insure a poor or sparse crop of the desired flower. Therefore, in order to insure a continued and certain supply of various aromas, it is necessary to synthesize the compounds which possess the desired odor. By utilizing these synthetic compounds in place of the naturally occurring compounds, it is possible to prepare aroma chemicals such as geraniol, linalool, geranyl chloride, linalyl chloride, geranyl acetate, linalyl acetate, etc., which may be used in formulations thereafter used in the perfume and soap industry for preparing the formulations which are used to scent soaps, detergents, talcums, perfumes, colognes, etc.

In this respect, it has now been discovered that certain hydrocarbons, and particularly a diolefinic hydrocarbon such as isoprene, may be treated in the presence of certain catalysts of the type hereinafter set forth in greater detail to prepare novel compositions of matter which possess distinctive, desirable, and pleasing odors.

It is therefore an object of this invention to prepare novel compositions of matter hereinafter set forth in greater detail.

A further object of this invention is to provide a process for effecting the polymerization and particularly the dimerization of certain diolefinic hydrocarbons to prepare novel compositions of matter useful in the fragrance field.

In one aspect an embodiment of this invention resides in a process for the selective dimerization of a conjugated diolefinic hydrocarbon which comprises treating said hydrocarbon at dimerization conditions in the presence of an organopalladium complex, and recovering the resultant dimer.

A specific embodiment of this invention is found in a process for the dimerization of isoprene which comprises treating isoprene at a temperature in the range of from about 25° to about 250°C. and at a pressure in the range of from about atmospheric to about 100 atmospheres in the presence of a catalyst consisting of tetrakis(triphenylphosphite)-palladium(0), and recovering the resultant 2,7-dimethyl-1,3,7-octatriene.

Other objects and embodiments will be found in the following further detailed description of the present invention.

It has now been discovered that selective dimerization of unsaturated compounds, and particularly diolefinic hydrocarbons may be effected in the presence of certain catalytic compositions of matter under dimerization conditions. These dimerization conditions will include temperatures ranging from ambient (25°C.) up to about 250°C. or more and at a pressure in the range of from about atmospheric to about 100 atmospheres or more. When utilizing superatmospheric pressure, the desired pressure may be provided for by the introduction of a substantially inert gas such as nitrogen into the reaction vessel, the amount of pressure which is utilized by that which is necessary to maintain a major portion of the reactant in the liquid phase. The reaction time during which the dimerization of the diolefinic hydrocarbon is effected may range from about 0.5 up to about 24 hours or more in reaction the desired residence time which is required to effect the dimerization being dependent upon a number of variable conditions or factors among which will include the particular diolefinic hydrocarbon, the reaction temperature and the reaction pressure, etc.

The catalytic composition of matter which is utilized to effect the dimerization of the diolefinic hydrocarbon will comprise an organopalladium complex. Specific examples of these organopalladium catalysts will include tetrakis(triphenylphosphite)palladium(0), tetrakis(tribenzyl-phosphite)palladium(0), tetrakis(tritolylphosphite)palladium(0), tetrakis(triethylbenzylphosphite)palladium(0), tetrakis(trixylylphosphite)-palladium(0), etc. It is to be understood that the aforementioned organopalladium complexes are only representative of the type of catalyst compositions which may be used, and that the present invention is not necessarily limited thereto.

As hereinbefore set forth, the utilization of the particular catalytic composition of matter will permit a selective dimerization of the diolefinic hydrocarbon. For example, when dimerizing a branched chain diolefinic hydrocarbon, it has been found that the dimerization will be effected in a manner whereby a greater proportion of a tail to tail dimer will be obtained rather than that proportion which is obtained in a random head to head, head to tail, or tail to tail dimerization. Examples of unsaturated compounds, and particularly diolefinic hydrocarbons, which may undergo dimerization according to the process of this invention will include straight chain diolefins such as 1,3-butadiene, 1,3-pentadiene, 1,3-hexadiene, 2,4-hexadiene, 1,3-heptadiene, 2,4-heptadiene, etc., branched chain diolefinic hydrocarbons such as 2-methyl-1,3-butadiene (isoprene), 2,3-dimethyl-1,3-butadiene, 2-methyl-1,3-pentadiene,3-methyl-1,3-pentadiene, 2,3-dimethyl-1,3-pentadiene, 2-methyl-1,3-hexadiene, 3-methyl-1,3-hexadiene, 2-methyl-2,4-hexadiene, 2-methyl-1,3-heptadiene,3-methyl-1,3-heptadiene, 2-methyl-2,4-heptadiene, 3-methyl-2,4-heptadiene, 2-methyl-1,3-octadiene, 2-methyl-2,7-octadiene, 3-methyl-2,7-octadiene, 2-methyl-6-methylene-2,7-octadiene (myrcene), etc. It is to be understood that the aforementioned diolefinic hydrocarbons are only representative of the class of compounds which may be subjected to a selective dimerization reaction, and that the present invention is not necessarily limited thereto.

The process of this invention in which the diolefinic hydrocarbon is subjected to dimerization in the presence of certain catalysts may be effected in any suitable manner and may comprise either a batch or continuous type operation. For example, when a batch type operation is used, the particular diolefinic hydrocarbon such as isoprene is placed in an appropriate apparatus, the particular reaction vessel being dependent upon whether or not superatmospheric pressures are to be used to effect the reaction. For example when utilizing a reaction which is to be effected at superatmospheric pressure, the diolefinic hydrocarbon is charged to an autoclave which may be of the rotating or mixing type and which contains the organopalladium catalyst of the type hereinbefore set forth in greater detail. The vessel is sealed, nitrogen is pressed in until the desired operating pressure has been reached and the reaction vessel is then heated to the desired temperature. Upon completion of the predetermined residence time, the autoclave and contents thereof are allowed to return to room temperature, the excess pressure is discharged and the reaction mixture is recovered. The reaction mixture is then separated from the catalyst and subjected to conventional means of separation and recovery whereby the desired dimer which possess the particular configuration such as, as hereinbefore set forth, a tail to tail linkage may be recovered. The conventional means of separation and recovery which may be employed will include washing, drying, extraction, fractional distillation, etc., whereby the desired cuts are separated from another unreacted starting material and/or side product which may have been formed during the reaction.

It is also contemplated within the scope of this invention that the process to effect a selective dimerization of the diolefinic hydrocarbon may be effected in a continuous manner of operation. For example, one particular type of continuous type of operation which may be effected comprises the fixed bed operation in which the catalyst is disclosed as a fixed bed in a reaction zone which is maintained at the proper operating conditions of temperature and pressure. The particular diolefinic hydrocarbon such as isoprene which is to undergo dimerization is continuously charged to the reaction zone and passed through the fixed bed of the catalyst in either an upward or downward flow. Upon completion of the desired residence time, the reactor effluent is continuously withdrawn from the reactor and subjected to separation from the type hereinbefore set forth in greater detail whereby the selective dimers possessing a tail to tail linkage are separated and recovered from any unwanted dimer, said reaction products which may have been formed and unreacted diolefinic hydrocarbons, the latter being recycled to form a portion of the feed stock. Another type of continuous type operation which may be used comprises the moving bed type operation in which the catalyst and the diolefinic hydrocarbon such as isoprene are passed through the reaction zone which is maintained at the proper operating conditions of temperature and pressure either concurrently or countercurrently to each other. Yet another type of operation which may be used comprises the slurry type of operation in which the catalyst is carried into the reaction zone as a slurry with the diolefinic hydrocarbon. In the latter two types of operation the reactor effluent is also continuously withdrawn from the reaction zone and treated in a manner similar to that described for the treatment of the reactor effluent in the fixed bed type of operation, the desired dimer containing a specific configuration being recovered while the unreacted diolefinic hydrocarbon is recycled to form a portion of the feed stock.

The following examples are given to illustrate the process of the present invention which, however, are not intended to limit the generally broad scope of the present invention in strict accordance therewith.

EXAMPLE I

The catalyst complex which is utilized for the dimerization of isoprene was prepared by adding 15.5 g. (0.05 mol) of triphenylphosphite to a hot, nitrogen purged, solution of 1.7 g. (0.01 mol) of palladium chloride in 100 cc. of acetonitrile, followed by the dropwise addition of 5 cc. of diethylamine. The solution was cooled under a nitrogen blanket and the resulting crystals were filtered under a suction of a nitrogen purged container. The product was recrystalized from 250 cc. of hot nitrogen purged absolute ethyl alcohol, said product forming as white plates which had a melting point of 123 ° –127 ° C. and comprise tetrakis(triphenylphosphite)palladium(0).

Following this, 51 g. (0.75 mol) of isoprene and 1.25 g. (0.00093 mol) of tetrakis(triphenylphosphite)palladium(0) were placed in the glass liner of a rotating autoclave which was sealed and heated to a temperature of 115°C. The autoclave was allowed to remain at this temperature of 115°C. for a period of 7 hours. At the end of this time, heating was discontinued, the autoclave was allowed to return to room temperature and the reaction mixture was recovered.

Analyses, by means of a gas liquid chromatograph, of the mixture disclose the presence of 69 percent of the 2,7-dimethyl-1,3,7-octatriene with only 27.4 percent of the 2,6 -dimethyl-1,3,7-octatriene, 0.4 percent of the 3,6-dimethyl-1,3,7-octatriene and 3.2 percent of other $C_{10}$ isomers.

EXAMPLE II

In this example 40.5 g. (0.75 mol) of 1,3,-butadiene is placed in a rotating autoclave which contains 1.25 g. (0.0009 mol) of tetrakis-(tribenzylphosphite)palladium(0). The autoclave is sealed and heated to a temperature of about 110 ° C. for a period of 7 hours. At the end of this time, heating is discontinued and the autoclave allowed to return to room temperature. The autoclave is opened and the reaction mixture is recovered. After separation of the mixture from the catalyst, analysis by means of a gas liquid chromotograph will disclose the presence of 1,3,7-octatriene.

EXAMPLE III

In this example 109 g. (0.75 mol) of myrcene (2 - methyl-6-autoclave which contains 1.25 g. (0.0009 mol) of tetrakis(tritolylphosphite)palladium(0). The autoclave is sealed and nitrogen is pressed in until an initial pressure of 30 atmospheres is reached. The autoclave is then heated to a temperature of 150 ° C. and maintained thereat for a period of 8 hours. At the end of this 8 hour period, heating is discontinued, the autoclave is allowed to return to room temperature, the excess pressure is discharged and the autoclave is opened. The reaction mixture is recovered, separated from the catalyst by filtration and analyzed by means of a gas liquid chromotograph. This analysis will disclose the presence of the selective dimer which is 2,15-dimethyl-6,11-dimethylene-2,7,14-hexadecatriene.

I claim as my invention:

1. A process for the selective dimerization of a conjugated diolefinic hydrocarbon which comprises treating said hydrocarbon at dimerization conditions including a temperature of from about 25° to about 250° C. and a pressure of from about atmospheric to about 100 atmospheres in the presence of an organopalladium complex selected from the group consisting of tetrakis (triphenylphosphite) palladium(0), tetrakis(tribenzylphosphite)palladium(0), tetrakis(tritolylphosphite)palladium(0), tetrakis(triethylbenzylphosphite)palladium(0) and tetrakis(trixylylphosphite)-palladium(0).

2. The process of claim 1 in which said conjugated diolefinic hydrocarbon is isoprene.

3. The process as set forth in claim 1 in which said organopalladium complex is tetrakis(triphenylphosphite)palladium(0).

4. The process as set forth in claim 1 in which said organopalladium complex is tetrakis(tribenzylphosphite)palladium(0).

5. The process as set forth in claim 1 in which said organopalladium complex is tetrakis(tritolylphosphite)palladium(0).

6. The process as set forth in claim 3 in which said conjugated diolefinic hydrocarbon is 2-methyl-1,3-butadiene.

7. The process as set forth in claim 3 in which said conjugated diolefinic hydrocarbon is 1,3-butadiene.

8. The process as set forth in claim 3 in which said conjugated diolefinic hydrocarbon is 2-methyl-6-methylene-2,7-octadiene.

9. The process of claim 3 in which said conjugated diolefinic hydrocarbon is isoprene.

* * * * *